United States Patent Office 2,715,602
Patented Aug. 16, 1955

2,715,602

PROCESS FOR THE MANUFACTURE OF VITAMIN $B_{12}$

Robert E. Hargrove, Alexandria, Va., and Abraham Leviton, Washington, D. C., assignors to the United States of America as represented by the Secretary of Agriculture No Drawing. Application August 31, 1951, Serial No. 244,686

10 Claims. (Cl. 195—96)

(Granted under Title 35, U. S. Code (1952), sec. 266)

The invention herein described may be manufactured and used by or for the Government of the United States of America for governmental purposes throughout the world without the payment to us of any royalty thereon.

This invention has for its object, the method of producing high yields of vitamin $B_{12}$ in the fermentation of nutrient mashes by species of Propionibacterium. During the course of screening tests with representative microbial strains that are commonly isolated from cheese we have discovered that Propionibacteria are capable of producing vitamin $B_{12}$. Using the Medium I given below, it was found that the microorganisms identified as *Propionibacterium freudenreichii* and *P. shermanii* produced 6 and 3 micrograms of vitamin $B_{12}$ per liter respectively. This corresponded to the utilization of 6 grams of glucose in each culture.

MEDIUM I

| | |
|---|---|
| Acid hydrolysate of casein | g 10 |
| l-Tryptophane | g 0.2 |
| l-Cystine | g 0.4 |
| Asparagine | g 0.2 |
| Xanthine | g 0.02 |
| Adenine, guanine, uracil | g 0.02 |
| Riboflavin, thiamine | mg 1.0 |
| Niacin | mg 2.0 |
| Biotin | micrograms 8.0 |
| Pyridoxine, pyridoxal | mg 4 |
| Pyridoxamine | mg 0.08 |
| d-Calcium pantothenate | mg 1.0 |
| Para-aminobenzoic acid | mg 2.0 |
| Tween 80 solution | g 2.0 |
| Dextrose | g 20 |
| $KH_2PO_4$, $K_2HPO_4$ | g 0.5 |
| $MgSO_4$ | g 0.4 |
| NaCl, $FeSO_4$, $MNSO_4$ | g 0.02 |
| N/5 phosphate | ml 50 |
| Buffer pH | 6.8 |
| Add water and NaOH to yield one liter of solution at pH | 6.8 |

The yields obtained are low from the standpoint of industrial microbiology. It would appear from a survey of the literature that in order for a particular organism and a particular medium to be adaptable for the industrial production of vitamin $B_{12}$, yields of the order of magnitude of hundreds of micrograms per liter should be obtainable.

We have made the interesting discovery that by the adjustment of the cobalt concentration in various media acted upon by propionic acid bacteria, and by the selection of lactic acid as a source of carbon, yields as high as 1500 micrograms of vitamin $B_{12}$ per liter may be obtained.

Apart from its significance in vitamin $B_{12}$ production, the propionic acid fermentation is considered in industrial microbiology as a potential source of propionic acid (Industrial Microbiology, Samuel Cate Prescott and Cecil Gordon Dunn, McGraw Hill Book Co., 2nd ed., p. 477–486, 1949, New York, N. Y.). This dual function places a special emphasis on the utility of this fermentation.

Apart from their application in industrial microbiology as a potential source of propionic acid, and now in the light of our discovery as a potential industrial source of vitamin $B_{12}$, the propionic bacteria and the use of pure cultures have significance in the manufacture of high grade Emmenthaler or Swiss cheese. The application of our discovery leads to the development of large quantities of vitamin $B_{12}$ in Swiss cheese. Calculations show that it is theoretically possible to increase the vitamin $B_{12}$ content of cheese many fold by suitable additions of cobalt salts of the order of magnitude of 4.5 milligrams of cobalt chloride, $CoCl_2$—$6H_2O$, equivalent to 1.1 milligrams cobalt ion per liter of kettle milk.

Having described the basic premises upon which our invention rests, we now seek by the use of example and illustration to describe in greater detail our invention, its utility, its novelty and its limitations.

Example I

In this example, the influence of cobalt ion is strikingly illustrated. Medium I augmented by the addition of 15 ml. of a solution of cobalt chloride, $CoCl_2$—$6H_2O$, equivalent to 1.1 milligrams cobalt ion per liter was used. The contents of one vessel was inoculated with a heavy inoculum of *P. freudenreichii*, the other with *P. shermanii*. The pH adjustment with NaOH was effected from day to day. Incubation was at 30°. After 12 days $B_{12}$ assays were begun. The *P. shermanii* culture yielded 60 micrograms per liter compared to 3 micrograms obtained in the absence of added cobalt ion; the *P. freudenreichii* culture yielded 100 micrograms per liter compared to the 6 micrograms per liter obtained in the absence of added cobalt ion. On the basis of carbohydrate consumed, the yields were 2.5 and 4 micrograms per gram compared to 0.5 and 1 microgram per gram obtained in the absence of added cobalt ion.

Example II

In this example, the influence of lactic acid as a source of carbon is strikingly illustrated. Medium I was used with 10 grams of lactic acid substituted per liter for 20 grams of glucose. As in the previous example, one sample was inoculated with *P. shermanii* and the other with *P. freudenreichii*. No attempt was made to adjust pH. After 14 days incubation at 30° C., assays were made for vitamin $B_{12}$ with *Lactobacillus leichmanii* as the test organism. Sixty-eight micrograms per liter were obtained with *P. shermanii*, corresponding to a yield of 6.8 micrograms per gram of lactic acid; 100 micrograms per liter were obtained with *P. freudenreichii*, corresponding to a yield of 13.6 micrograms per gram of lactic acid. These yields exceed significantly the corresponding yields of 2.5 and 4.0 micrograms per gram of glucose.

Example III

In this example, the favorable influence of cobalt ion and lactic acid is further illustrated. The basal medium used consisted of one part skim milk solids, one part whey solids, 2 parts water and 15 ml. per liter of a solution containing cobalt chloride, $CoCl_2$—$6H_2O$, equivalent to 1.1 mg. per liter cobalt ion. Shake bottles containing basal medium were inoculated with the microorganisms listed in Table I.

TABLE I

| Sample No. | Inoculum | Vitamin $B_{12}$, micrograms per liter |
|---|---|---|
| 1 | P. shermanii | 100 |
| 2 | P. shermanii + L. bulgaricus | 153 |
| 3 | P. shermanii + S. thermophilus | 223 |
| 4 | Hansen lactic starter | 146 |
| 5 | P. freudenreichii | 84 |
| 6 | P. freudenreichii + L. bulgaricus | 352 |
| 7 | P. freudenreichii + S. thermophilus | 175 |
| 8 | P. freudenreichii + Hansen lactic starter | 350 |

After shaking in closed bottles for seven days at 30°, the various samples were assayed for vitamin $B_{12}$. The results are given in Table I. The marked increase in yields brought about by the association of lactic acid bacteria with the propionic acid formers is strikingly illustrated. This increase in view of the results previously disclosed is attributable to the utilization by P. shermanii and P. freudenreichii of the lactic acid formed by the lactic acid-producing organisms. Thus in lacteal media (milk, and media derived from milk) and other natural carbohydrate media, the lactic acid essential for high yields need not be obtained externally, but may be produced as the result of symbiotic action with lactic acid bacteria.

*Example IV*

In this example, the source of nitrogen and other factors were varied to give a rich medium in which optimum conditions for a rapid fermentation exist. The basal medium consisted of 1 percent N-Zamine Type A (an enzymatic casein digest), 0.3 percent yeast extract (Difco), and 6.0 mg. cobalt chloride, $CoCl_2$—$6H_2O$, equivalent to 1.5 mg. cobalt ion per liter. In this experiment the percentages of lactic acid in the form of lactate were varied according to the following table.

TABLE II

| Sample No. | Percent lactate | Inoculum | Vitamin $B_{12}$, micrograms per liter |
|---|---|---|---|
| 1 | 0.5 | P. freudenreichii | 500 |
| 2 | 1.0 | do | 700 |
| 3 | 1.5 | do | 800 |
| 4 | 2.0 | do | 800 |
| 5 | 0.5 | P. shermanii | 440 |
| 6 | 1.0 | do | 560 |
| 7 | 1.5 | do | 700 |
| 8 | 2.0 | do | 480 |

After shaking in bottles over a period of 10 days at 30° C., all samples were assayed for $B_{12}$. The results are given in Table II. As noted, all samples from this relatively rich medium showed a marked increase in $B_{12}$ production over the previously described examples. From these data, it appears that the concentration of lactate is definitely a limiting factor for the production of $B_{12}$. A concentration of 1.5% lactate approaches the optimum for P. shermanii, while with P. freudenreichii a concentration of 2% may be employed without loss in yield. Especially good results were obtained when this experiment was repeated with glycerol substituted as the carbon source. A medium containing 1-2% glycerol was found to be optimum.

*Example V*

In this example, the influence of oxygen on $B_{12}$ production is shown. The basal medium contained 1% N-Zamine, 0.3% yeast extract, 1% sodium lactate and 6 mg. cobalt chloride, $CoCl_2$—$6H_2O$, equivalent to 1.5 mg. cobalt ion per liter. A constant inoculum of P. freudenreichii was used for all fermentations. The oxygen tension was varied in each of three fermentations. To establish complete anaerobiosis, nitrogen was passed through the medium during fermentation; to establish aerobic conditions, air was passed through the fermentation medium; and to establish a micro-aerophilic condition, a limited amount of oxygen was allowed to mix with the fermentation liquor. Each fermentation was incubated at 30° C. for 8 days. Each day samples were removed to determine pH, turbidities and $B_{12}$ production. The results are shown in Table III.

TABLE III

| Sample No. | Condition | Vitamin $B_{12}$, micrograms per liter |
|---|---|---|
| 1 | Anaerobic | 560 |
| 2 | Micro-aerophilic | 800 |
| 3 | Aerobic | 23 |

From Table III it may be seen that oxygen has a tremendous influence on the production of vitamin $B_{12}$. These data indicate that a limited amount of oxygen is necessary for optimum $B_{12}$ production. However, with excessive aeration, practically no vitamin $B_{12}$ is produced.

What constitutes a micro-aerophilic condition is not clearly definable in terms of oxygen tension. In this invention the micro-aerophilic condition is defined as that state in which the oxygen available to the organism is limited to that normally contained in the head space of a fermentation vessel at the onset of fermentation. Whatever oxygen is consumed is not replaced.

*Example VI*

This example is included to show that this particular invention does not apply specifically to the microorganisms, P. freudenreichii and P. shermanii, but that other members of the genus propionibacterium also produce substantial amounts of vitamin $B_{12}$. Seven additional species of Propionibacterium were examined for their ability to synthesize vitmain $B_{12}$ in a medium containing 1% N-Zamine, 1% lactate, 0.3% yeast extract and 6 mg. cobalt chloride, $CoCl_2$—$6H_2O$, equivalent to 1.5 mg. cobalt ion per liter. After 10 days incubation at 30° C., the fermentation liquors were assayed for vitamin $B_{12}$. The results are shown in Table IV.

TABLE IV

| Culture | Vitamin $B_{12}$, micrograms per liter |
|---|---|
| P. theonii | 180 |
| P. zea | 500 |
| P. arabinosus | 360 |
| P. rubrum | 375 |
| P. peterssonii | 375 |
| P. pentosaceum | 358 |
| P. jensenii | 370 |
| P. freudenreichii | 420 |
| P. shermanii | 400 |

*Example VII*

This example illustrates the influence of variations in the concentration of nitrogenous compounds on yields of vitamin $B_{12}$. Both yeast and beef extract are used as a source of vitamins and other factors required by the organism. The following media were prepared:

| No. | Ingredient | | | |
|---|---|---|---|---|
| | Yeast extract | Beef Extract | Sodium lactate | N-Zamine |
| | Percent | Percent | Percent | Percent |
| 1 | 0.4 | none | 1.0 | none |
| 2 | 0.4 | none | 1.0 | 0.5 |
| 3 | 0.4 | none | 1.0 | 1.0 |
| 4 | 0.4 | none | 1.0 | 2.0 |
| 5 | 0.4 | none | 1.0 | 3.0 |
| 6 | none | 0.3 | 1.0 | 1.0 |
| 7 | none | 0.6 | 1.0 | 1.0 |
| 8 | none | 1.0 | 1.0 | 1.0 |
| 9 | none | none | 1.0 | 1.0 |
| 10 | 0.5 | none | 1.0 | 1.0 |
| 11 | 1.0 | none | 1.0 | 1.0 |
| 12 | 1.5 | none | 1.0 | 1.0 |

Eight milligrams of cobalt chloride, $CoCl_2—6H_2O$, equivalent to 2.0 mg. cobalt ion per liter was added to each of the 12 media.

The inoculum was a 5-percent three-day-old culture of *P. freudenreichii,* and the media were adjusted to pH 7.0. After five days, in which the media were shaken in closed bottles, analyses gave the following results:

| Sample No. | Vitamin $B_{12}$, micrograms per liter |
|---|---|
| 1 | 300 |
| 2 | 330 |
| 3 | 430 |
| 4 | 590 |
| 5 | 600 |
| 6 | 390 |
| 7 | 440 |
| 8 | 460 |
| 9 | 80 |
| 10 | 440 |
| 11 | 450 |
| 12 | 460 |

These results indicate that up to 0.5 percent yeast or beef extract is a necessary supplement to the proteinaceous material in order to obtain higher yields. Increasing the concentration of proteinaceous material up to 2 percent increases yield.

*Example VIII*

This example illustrates the applicability of the laboratory scale results to small pilot plant scale experiments. The medium consisted of 12 liters tap water, 180 grams N-Zamine, 48 grams yeast extract, 1.8 milliliters of cobalt chloride, $CoCl_2—6H_2O$ (30 g./l.), 12 ml. 2.38 N NaOH, and 240 ml. sodium lactate (75 g./100 ml.). The batch was sterilized at 120° C. for 1 hour, and then cooled to 30°. The inoculum was 1 liter of a four-day old *Propionibacterium freudenreichii* culture. Incubation temperature was 30°. Nitrogen was passed through at approximately 1 liter per minute for 15 minutes. The contents of the vessel were stirred without access to air. After one day, 240 micrograms of vitamin $B_{12}$ had been synthesized, after two days 600, after three days 700, and after four days 740. After three days 12 ml. of 4.65 N HCl was added to restore the pH from 7.4 to 6.95.

*Example IX*

The utility of the invention is demonstrated by this example. By altering the normal procedures employed in the manufacture of Swiss cheese, the $B_{12}$ content of the cheese was increased more than twofold.

Salts of cobalt were added to the cheese milk in the quantity of 1–2 milligrams per liter of milk. The treatment of the propionic inoculum was such as to permit a rapid growth of the propionic bacteria in the cheese. Excellent cheese as well as increase in the vitamin $B_{12}$ content were noted when our technique was employed.

The normal $B_{12}$ content of 8 domestic Swiss type cheese ranged from 30 to 40 micrograms per kilogram of cheese.

| Cheese type | $B_{12}$ assay, micrograms per kilogram |
|---|---|
| Normally manufactured | 43 |
| Altered procedure | 120 |

Extending the quantity of added cobalt beyond about 1.5 milligrams per liter to the point at which cobalt becomes toxic to the organism but not beyond this point, does not influence vitamin $B_{12}$ yield significantly. Cobalt comprises about 4% of the vitamin $B_{12}$ molecule, and therefore the microbial synthesis of even small quantities of vitamin $B_{12}$ requires the presence of cobalt. Within the range of concentration of cobalt in which it is the limiting factor for vitamin $B_{12}$ synthesis, the yield of vitamin $B_{12}$ will increase in some manner with increases in cobalt concentration. However, a saturation range is reached in which not cobalt but other limiting factors begin to control the synthesis. The concentrations of cobalt specified in our examples fall within this saturation range.

Under a given set of experimental conditions, yield increases with cell growth. We prefer to carry out the fermentation at about 30°, within the optimum range for growth. However, obviously other temperatures may be employed within the limits of 10°–35° C. in which the organism will grow.

We claim:

1. A process for the production of vitamin $B_{12}$ comprising inoculating bacteria of the genus Propionibacterium in a growth medium containing cobalt.
2. The process of claim 1 in which air is excluded.
3. The process of claim 1 in which a micro-aerophilic condition is established.
4. The process of claim 1 in which the medium contains a lactate as a source of carbon.
5. The process of claim 1 in which the medium contains glycerol as a source of carbon.
6. A process for the production of vitamin $B_{12}$ comprising inoculating bacteria of the genus Propionibacterium and lactic acid bacteria in a growth medium containing a fermentable carbohydrate and cobalt.
7. The process of claim 6 in which air is excluded.
8. The process of claim 6 in which a micro-aerophilic condition is established.
9. A process for the production of vitamin $B_{12}$ comprising inoculating bacteria of the genus Propionibacterium in a lacteal medium containing lactose and cobalt.
10. A process for the production of vitamin $B_{12}$ comprising inoculating bacteria of the genus Propionibacterium and lactic acid bacteria in a lacteal medium containing lactose and cobalt.

References Cited in the file of this patent

UNITED STATES PATENTS

| 1,459,959 | Sherman | June 26, 1923 |
| 2,566,123 | De Rose | Aug. 28, 1951 |
| 2,595,499 | Wood et al. | May 6, 1952 |

OTHER REFERENCES

Porter: Bacterial Chemistry and Physiology, 1946, Wiley, page 943.

Abelson et al.: Science, November 25, 1949, vol. 110, page 566.

Hendlin et al.: Science, May 19, 1950, vol. 111, pages 541–542.